United States Patent

Mejuhas

(10) Patent No.: US 8,708,417 B2
(45) Date of Patent: Apr. 29, 2014

(54) SEAT AND RELATED LEG REST AND MECHANISM AND METHOD THEREFOR

(75) Inventor: Marsel Mejuhas, Schwaebisch Hall (DE)

(73) Assignee: Air New Zealand Limited, Auckland (NZ)

( * ) Notice: Subject to any disclaimer, the term of this patent is extended or adjusted under 35 U.S.C. 154(b) by 0 days.

(21) Appl. No.: 12/964,896

(22) Filed: Dec. 10, 2010

(65) Prior Publication Data

US 2011/0215200 A1    Sep. 8, 2011

(30) Foreign Application Priority Data

Dec. 11, 2009   (AU) ................................. 2009906037

(51) Int. Cl.
| | |
|---|---|
| A47C 7/50 | (2006.01) |
| A47C 1/034 | (2006.01) |
| A47C 1/035 | (2006.01) |
| A47C 20/00 | (2006.01) |
| A47C 20/04 | (2006.01) |

(52) U.S. Cl.
USPC ............ 297/423.26; 297/423.23; 297/423.24; 297/423.28

(58) Field of Classification Search
USPC ........... 297/69, 85 L, 423.23, 423.24, 423.26, 297/423.28
See application file for complete search history.

(56) References Cited

U.S. PATENT DOCUMENTS

| | | | |
|---|---|---|---|
| 4,113,311 A | | 9/1978 | Reida |
| 4,470,634 A | | 9/1984 | Delius et al. |
| 4,621,863 A | * | 11/1986 | Jackson et al. ........ 297/423.26 X |
| 5,333,818 A | * | 8/1994 | Brandt et al. ......... 297/423.22 X |
| 5,352,020 A | * | 10/1994 | Wade et al. ............... 297/423.26 |
| 5,447,359 A | * | 9/1995 | Asbjornsen et al. . 297/423.26 X |
| 5,560,681 A | * | 10/1996 | Dixon et al. .......... 297/423.26 X |
| 6,095,610 A | * | 8/2000 | Okajima et al. .......... 297/423.36 |
| 6,494,536 B2 | * | 12/2002 | Plant .................... 297/423.36 X |
| 6,669,143 B1 | * | 12/2003 | Johnson .................... 244/122 R |
| 6,695,406 B2 | * | 2/2004 | Plant ........................ 297/423.26 |
| 6,902,238 B1 | * | 6/2005 | Abt et al. .............. 297/423.26 X |
| 6,926,366 B2 | * | 8/2005 | Wolters .................... 297/423.36 |
| 7,004,542 B2 | * | 2/2006 | Saint-Jalmes ............ 297/284.11 |
| 7,121,627 B2 | * | 10/2006 | Gaikwad et al. ..... 297/423.36 X |

(Continued)

FOREIGN PATENT DOCUMENTS

DE    102006045206    4/2008

*Primary Examiner* — Rodney B White
(74) *Attorney, Agent, or Firm* — Dann, Dorfman, Herrell and Skillman, P.C.

(57) ABSTRACT

In one embodiment now described, and according to one aspect of the invention. There is provided a leg rest mechanism 100. The leg rest mechanism is suitable for use with a seat pad 200 of a seat arrangement 300 in a passenger vehicle (not shown). The leg rest mechanism 100 comprises a support member 110 adapted for at least partially supporting a passenger's weight; and an extension arrangement 400. The extension arrangement 400 comprises a pair of horizontal support mechanisms 120 for supporting the support member 110, an adjustable support mechanism 160 and a drive arrangement 20. The support member 110 is moveable between a stowed position in which it is stowable under the seat pad 200 of the passenger vehicle seat arrangement 300, an intermediate position up to which the support member 110 can be adjustably supported; and wherein the support member is moveable directly from its intermediate position to an extended position in which the support member 110 cooperates with the seat pad to defines a substantially horizontal surface on which a passenger is supportable.

30 Claims, 10 Drawing Sheets

(56) References Cited

U.S. PATENT DOCUMENTS

| | | |
|---|---|---|
| 7,156,462 B2 * | 1/2007 | Verny et al. ............. 297/423.3 X |
| 7,213,882 B2 * | 5/2007 | Dryburgh et al. ...... 244/118.6 X |
| 7,338,132 B2 * | 3/2008 | LaPointe .................. 297/423.26 |
| 7,429,083 B2 * | 9/2008 | Tsuji et al. ............... 297/423.26 |
| 7,458,643 B2 * | 12/2008 | Johnson ............... 297/423.26 X |
| 7,798,446 B2 * | 9/2010 | Park ........................... 244/118.6 |
| 8,313,060 B2 * | 11/2012 | Darbyshire ................ 244/118.6 |
| 2003/0080597 A1 * | 5/2003 | Beroth et al. ........ 297/423.26 X |
| 2004/0100137 A1 * | 5/2004 | Johnson ................... 297/423.26 |
| 2012/0228919 A1 * | 9/2012 | Dowty et al. .............. 297/85 M |

* cited by examiner

SEAT AND RELATED LEG REST AND MECHANISM AND METHOD THEREFOR

TECHNICAL FIELD

The present invention relates to a seat and/or related leg rest and/or mechanism and/or a method of operation therefor. More particularly but not exclusively it relates to a leg rest and associated mechanism suitable for use in a passenger vehicle such as an aircraft.

BACKGROUND OF THE INVENTION

Leg rests for seats, and in particular vehicle seats, are well known. Many variants of structure are possible, and such seats operate on many different principle of operation.

Leg rests and their structures are an additional expense and add weight, hence greater associated fuel costs. Hence typically leg rests are found in premium class seats in passenger aircraft only where such costs are more easily recoverable.

The weight of the leg rest and its associated mechanism is to be as light as possible yet still be able to adequately and safely function. It is also important that the leg rest and its associated mechanism be cheap to install and maintain.

When a leg rest is designed to extend from a seat arrangement in a cantilevered fashion, it is typically required to have a very robust design. This is because the leg rest support member itself acts as a large lever, and applying a persons leg weight to the support member will produce a large amount of torque on the seat structures, which requires robustly designed support structures to prevent damage to the seat arrangement.

In order for a leg rest and its associated extension arrangement to be regarded as appropriate for use in a passenger aircraft, it must be as light as possible. Further, where the leg rest extends and/or retracts by means of a powered mechanism, the possibility of injury to a passenger exists.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

OBJECT OF THE INVENTION

It is an object of the present invention to provide a seat and/or leg rest and/or related mechanism and/or a method of operation therefor, that overcomes or at least partially ameliorates some of the abovementioned disadvantages or which at least provides the public with a useful choice.

SUMMARY OF THE INVENTION

In a first aspect the present invention may be said to be a leg rest mechanism suitable for use together with a seat pad of a seat in a passenger vehicle, said leg rest mechanism comprising;
 a support member moveably mounted adjacent said seat and adapted for supporting a passengers leg;
  said support member can be supported in and is moveable between
   a stowed position in which it is stowable under the seat pad of the seat and;
   at least one intermediate position located in a range between the stowed position and an intermediate limit between the stowed condition and the extended condition; and
   an extended position in which the support member defines a substantially horizontal surface on which a passenger is at least in part supportable; and
 an extension arrangement for supporting the support member, including
  an adjustable support mechanism for supporting the support member in a plurality of positions between its stowed position and its intermediate position(s),
  a horizontal support mechanism for supporting the support member in its extended position, and
  a drive arrangement for moving the support member from its stowed position to its intermediate position(s);
 wherein the adjustable support mechanism only allows support to be offered to said support member in the intermediate position(s), and
 wherein the extension arrangement is only manually moveable between its extended position and the intermediate limit.

In a second aspect the present invention may be said to be a leg rest mechanism suitable for use together with a seat pad of a seat in a passenger vehicle, said leg rest mechanism comprising;
 a support member adapted for supporting a passengers leg, said support member being moveable between
  a stowed position in which it is stowable under the seat pad of the passenger vehicle seat and;
  at least one intermediate position located in a range between the stowed position and an intermediate limit between the stowed condition and the extended condition; and
  an extended position in which the support member defines a substantially horizontal surface on which a passenger is at least partially supportable, the support member moveable directly from between the intermediate limit and the extended position without being capable of being supported there between; and
 an extension arrangement for supporting the support member in the intermediate position(s) and the extended position, said extension arrangement, including
  an adjustable support mechanism for supporting the support member in a plurality of positions between its stowed position and its intermediate position, and
  a horizontal support mechanism for supporting the support member in its extended position; and
 wherein the extension arrangement is only manually moveable between its extended position and the intermediate limit.

In a further aspect the present invention may be said to be a leg rest mechanism suitable for a passenger vehicle seat having at least a seat pad; said leg rest comprising
 a support member adapted for supporting a passengers leg;
  said support member being moveable between
  a stowed position in which it is stowable under the seat pad of the passenger vehicle seat and;
  at least one intermediate position located in a range between the stowed position and an intermediate limit between the stowed condition and the extended condition; and
  an extended position in which the support member is pivoted upwardly more from said intermediate position, and an extension arrangement coupled to the support member for supporting the support member relative to said vehicle seat in at least its extended position; said extension arrangement comprising a track formation associated with one selected from the support member and the vehicle seat; and a track follower arrangement associated with the other selected from the support member and the vehicle seat;

wherein the track follower arrangement is adapted to follow along at least part of the track formation as the support member is moved between its stowed position and extended position; and wherein a detent formation is provided into which the track follower arrangement can become captured when moving along the track formation, when the support member is in the extended position to hold the extension member in the extended position.

Preferably the support member is only manually moveable between its intermediate limit and its extended position.

Preferably the extension arrangement comprises a plurality of horizontal support mechanisms.

Preferably the support member can be moved through an overextended position when being moved between its intermediate position and its extended position.

Preferably the adjustable support mechanism includes a drive arrangement for driving movement of the support member between its stowed position and its intermediate position(s).

Preferably the support member is pivotally coupled to the seat in a manner so that in its extended position is disposed so that the seat pad and the support member together co-operate to form a substantially horizontal surface.

Preferably the horizontal support mechanism comprises a track formation associated with one selected from the support member and the seat; and a track follower arrangement associated with the other selected from the support member and the seat;

the track follower arrangement following at least part of the track formation as the extension arrangement is moved between its stowed position and extended position;

wherein the track formation defines a detent formation for capturing the track follower arrangement as it moves along the track formation in one direction, thereby to prevent the movement of the support member to its stowed position by movement of the track follower arrangement along the track formation in the opposite direction.

Preferably the track follower arrangement and track formation are moveable relative to each other between a stowed position corresponding to the stowed position of the support member, an intermediate position corresponding to the intermediate position of the support member, and an extended position corresponding to the extended position of the support member and in which it supports the support member in its extended position.

Preferably the track follower arrangement and track formation are moveable relative to each other to an overextended position corresponding to the overextended position of the support member.

Preferably the adjustable support mechanism comprises a locking mechanism and a reaction member.

Preferably the adjustable support mechanism allows for lost motion movement.

Preferably the adjustable support mechanism allows for lost motion movement between the locking mechanism and the reaction member.

Preferably the adjustable support mechanism comprises a locking mechanism and a reaction member, one of the reaction member and the locking mechanism is secured to one of the seat and the support member, and the other of the reaction member and the locking mechanism is secured to the other of the seat arrangement and the support member, the locking member able to lock the support member in its intermediate position(s) and the adjustable support mechanism includes a lost motion arrangement to facilitate lost motion movement of the adjustable support mechanism when the support member moves between the extended position and the intermediate limit.

Preferably the lost motion arrangement comprises a reaction pin moveable in one selected from an aperture or recess.

Preferably the aperture or recess is in the reaction member.

Preferably the aperture is a slot.

Preferably the locking mechanism includes a piston and cylinder arrangement.

Preferably the piston and cylinder arrangement allows fluid to flow between either sides of the piston in the cylinder to allow the piston and cylinder arrangement to extend and/or retract.

Preferably the piston and cylinder arrangement may be locked in position by preventing the flow of fluid between opposite sides of the piston.

Preferably the locking mechanism is a Hydrolock™ locking hydraulic cylinder.

Preferably alternatively the locking mechanism is electrically driven.

Preferably the drive arrangement operates by a biasing means.

Preferably the biasing means is a spring.

Preferably the biasing means is a spring configured and adapted to extend the piston and cylinder arrangement.

Preferably the biasing means is a spring received within the cylinder of the piston and cylinder arrangement.

Preferably the locking mechanism is electrically driven by an electric motor.

Preferably alternately, the locking mechanism operates by means of a calliper type braking system that clamps onto a flange to lock the support member in place in regularly arranged locations between its stowed position and its intermediate position.

Preferably alternately, the locking mechanism operates by means of a spigot and socket formation that is configured and adapted to lock the support member in place in regularly arranged locations between its stowed position and its intermediate position.

Preferably the piston and cylinder arrangement is operable by means of one or more selected from hydraulics and pneumatics.

Preferably the piston and cylinder arrangement pushes on the reaction pin to move it along the slot between an outer position and an inner position.

Preferably the support member is substantially planar in configuration.

Preferably in its extended position, the support member cooperates with the seat pad of the seat to operationally provide a horizontal support surface for at least one passenger to be supported on.

Preferably the detent formation comprises a positively locking one way mechanism.

Preferably the detent formation is a recessed region of the cam slot.

Preferably alternately the detent formation is a pivoting mechanism that allows movement of the track follower arrangement along the track formation in one direction only.

Preferably the extension arrangement includes a release mechanism that is actuatable to allow movement of the track follower arrangement in said opposite direction along the track formation to allow the support member to move to its stowed position.

Preferably the track formation follows an endless path along at least part of its length, so that movement of the track follower arrangement along the track formation along the endless path will allow the extension arrangement to return to its stowed position by movement of the track follower arrangement along the track formation.

Preferably the extension arrangement is manually moveable from its intermediate limit position to its extended position by a person exerting manual force on one or more selected form the support member and extension arrangement.

Preferably the track formation includes a one-way mechanism that allows movement of the track follower arrangement along the track formation in one direction only.

Preferably the one-way mechanism is located along a portion of the endless path.

Preferably the one-way mechanism comprises a pivoting track closure formation.

Preferably the track closure formation pivots on an axis to a side of the track formation.

Preferably the track closure formation is adapted and configured to be moved by the track follower arrangement out of the endless path when the track follower arrangement moves in a one direction, and locks in position when the track follower arrangement exerts a force on it from the opposite direction.

Preferably the track closure formation is adapted and configured to be moved by the track following formation out of the track formation when the track following formation moves in a one direction, and locks in its position when the track follower arrangement exerts a force on it from the opposite direction.

Preferably the track closure formation pivots between a restricted position in which it restricts movement of the track following formation through the track formation in one direction, and an unrestricted position in which it allows movement of the track following formation along the track formation.

Preferably the track closure formation is biased to its restricted position by a biasing means.

Preferably the one or more selected form the support member and extension arrangement includes at least one manual handle.

Preferably the track follower arrangement is biased towards the track formation to be able to follow the track formation.

Preferably the track follower arrangement includes a biasing arrangement.

Preferably the track follower arrangement operates a cam following a cam surface.

Preferably the cam follower arrangement includes a track following formation.

Preferably the track following formation is a cam follower.

Preferably the track formation is a cam surface.

Preferably the cam surface is defined by a cam slot.

Preferably the biasing arrangement comprises
a base member secured to one selected from the support member and the seat arrangement;
and a pivotal member pivotable about an axis about the base member.

Preferably the biasing arrangement includes a biasing means for biasing movement of the pivotal member to pivot about said axis in one direction to follow the track formation.

Preferably the base member includes a stop formation against which the pivoting member can pushed to rigidly support the pivotal member to prevent the pivoting member from pivoting further about the base member.

Preferably the biasing means is one or more selected from
a spring, and
an elastically resilient formation.

Preferably the track following formation is disposed at a distal end of the pivotal member from its axis.

Preferably the support member is pivotally moveable relative to the seat.

Preferably the support member is pivotally moveable relative to the seat about an axis located adjacent the front edge of the seat pad and extending perpendicular to the seat facing direction.

Preferably the plurality of horizontal support mechanisms include a synchronisation mechanism to ensure that the track following formations of each of the horizontal support mechanisms are in synch with each other at the same location on each of their respective track formations Preferably each synchronisation mechanism comprises at least one cable securely fastened to a synchronisation lever.

Preferably the synchronisation lever is secured to the pivotal member to pivot about the same axis as the pivotal member.

Preferably the synchronisation lever is integrally formed with the pivotal member.

Preferably engaged to said seat in a manner to allow the support member to be supported in and to move, in a pivotal manner relative to said seat about an axis that is perpendicular to the seat facing direction, between said stowed position at least one intermediate position and the extended position.

Preferably the track formation includes said detent.

Preferably extension arrangement further comprises an adjustable support mechanism for supporting the support member in a wide variety of intermediate positions between its stowed position and the intermediate limit.

Preferably the extension arrangement is manually moveable to its extended position from its intermediate limit.

Preferably the track formation and track follower arrangement together form part of a horizontal support mechanism.

Preferably the support member is manually moveable directly from its intermediate position to its extended position.

Preferably the adjustable support mechanism further includes a drive arrangement for driving movement of the support member between its stowed position and its intermediate position.

Preferably the support member in its extended position is disposed so that the seat pad and the support member together co-operate to form a substantially horizontal surface.

Preferably one of the reaction member and the locking mechanism is secured to one of the seat arrangement and the support member, and the other of the reaction member and the locking mechanism is secured to the other of the seat arrangement and the support member.

Preferably the adjustable support mechanism includes a lost motion arrangement to allow for lost motion movement.

Preferably in its extended position, the support member is cooperates with the seat pad of the passenger vehicle seat to operationally provide a horizontal support surface for at least one passenger to be supported on.

Preferably in its extended position, the support member is located adjacent a similar seat arrangement disposed ahead of said seat arrangement Preferably the extension arrangement supports the support member in its extended position in a configuration so that the support member forms a co-planar surface with the seat pad.

Preferably the co-planar surface formed by the support member and the seat pad is horizontal.

Preferably the support member is pivotally moveable relative to the seat pad.

Preferably the support member is pivotally moveable relative to the seat pad about an axis towards the front edge of the seat pad.

Preferably the cable extends substantially tangentially to a radius extending from the axis of the pivotal member.

Preferably the cables of each synchronisation mechanisms are connected to each other, so that movement of the synchronisation lever of one results in equal movement of the synchronisation lever of the other.

In a further aspect the present invention may be said to be a leg rest of a seat, that can move between a stowed position adjacent and below the seat pan of the seat and a fully extended position adjacent and substantially co-planar with the seat pan, said leg rest comprising;

a leg rest pad adapted for supporting the legs of a passenger sitting in the seat, the leg rest pad pivotally mounted to said seat to pivot about an axis perpendicular to the seat facing direction;

an extension arrangement for moving the leg rest pad between the stowed position and the extended position and for holding the leg rest pad at least in its extended position, and an actuator to cause movement of the extension arrangement;

wherein the actuator can only cause movement to move the leg rest pad between its stowed position and a position intermediate of the stowed position and the extended position, and wherein movement of the leg rest pad from the intermediate position to the extended position can be actuated manually by a person.

Preferably the actuator can only cause movement of the leg rest pad from its stowed position to the intermediate position, and wherein movement of the leg rest pad from the intermediate position to the extended position can be actuated manually by virtue of a lost motion mechanism.

Preferably the extension arrangement and the actuator are supported by said seat.

A seat comprising a leg rest herein before defined.

In yet a further aspect the present invention may be said to be a seating arrangement on an aircraft comprising a plurality of rows of seats each row including at least one seat as claimed in claim 32 positioned to face is the same direction, each row positioned one behind the other and spaced apart with a gap between the rows that is substantially spanned by the leg rest when in the extended position.

In still a further aspect the present invention may be said to be a leg rest of a seat, that can move between a stowed position adjacent and below the seat pan of the seat and a more extended position adjacent and projecting forward from the seat pan, said leg rest comprising;

a leg rest pad adapted for supporting the legs of a passenger sitting in the seat, said leg rest pad being associated with an extension arrangement to facilitate movement and support of the leg rest pad in the stowed position and the extended position and support of the leg rest pad in at least one intermediate position that is located between (i) the stowed position and (ii) an intermediate limit located between the stowed position and the extended position.

Preferably at least the movement of the leg rest pad from the intermediate position to the extended position can be actuated manually by a person.

Preferably the more extended position is a position adjacent and substantially co-planar with the seat pan.

Preferably the leg rest pad is pivotally mounted to said seat to pivot about an axis perpendicular to the seat facing direction.

Preferably the extension arrangement and the actuator are supported by said seat.

In yet a further aspect the present invention may be said to be a seat comprising a leg rest as herein before described.

In still a further aspect the present invention may be said to be a seating arrangement on an aircraft comprising a plurality of rows of seats each row including at least one seat as herein before described, positioned to face is the same direction, each row positioned one behind the other and spaced apart with a gap between the rows that is substantially spanned by the leg rest when in the extended position.

In still a further aspect the present invention may be said to be a leg rest mechanism suitable for a passenger vehicle seat having at least a seat pad; said mechanism comprising;

a leg rest pad adapted for supporting a passenger's leg;

an extension arrangement for supporting the support member in a moveable manner between:

a stowed position in which the support member is stowed lower the seat pad of the passenger vehicle seat; and an extended position in which the support member at least partially supports a user's leg;

the extension arrangement comprising:

a cam associated with the support member or the vehicle seat; and a cam follower associated with the other of the support member and the vehicle seat, the cam and cam follower coupled together for movement relative each other as the extension arrangement is moved between its stowed position and extended position;

the cam follower guided by the cam to and from a position at which a detent can function to lock the cam follower in place and thereby hold the support member in the extended position against the influence of weight bearing onto the support member.

In still a further aspect the present invention may be said to be a seat arrangement comprising three contiguous seats each including a leg rest mechanism as herein before described, the three contiguous seats can cooperate together to form a horizontal support surface for at least one passenger to lie or recline on.

In still a further aspect the present invention may be said to be a method of operating a leg rest mechanism for a seat arrangement of a passenger seat, said seat arrangement comprising at least a seat pad, said method comprising the steps of:

actuating an adjustable support mechanism to drive an extension arrangement to move a support member from a stowed position to support it in an intermediate position;

manually extending the extension arrangement from its intermediate position to an extended position.

In yet a further aspect the present invention may be said to be a method of operating a leg rest mechanism for a seat arrangement of a passenger seat, said seat arrangement comprising at least a seat pad and a support member, said method comprising the steps of:

actuating an adjustable support mechanism to allow movement of a support member between a stowed position and an intermediate position;

moving the support member between its stowed position and its intermediate position; and manually moving the support member between its intermediate position and an extended position.

Preferably the extension arrangement supports the support member in its extended position in a configuration so that the support member forms a co-planar surface with the seat pad.

Preferably the co-planar surface formed by the support member and the seat pad is horizontal.

Preferably the extension arrangement supports the support member in its extended position to be adjacent to or abut with a similar seat arrangement in front of the seat arrangement.

In still a further aspect the present invention may be said to be an aircraft that includes a seating arrangement and/or a seat and/or seat with a leg rest mechanism as hereinbefore described.

Other aspects of the invention may become apparent from the following description which is given by way of example only and with reference to the accompanying drawings.

For the purposes of this specification, the term "track" or "track formation" shall be construed to mean a general term for a wide range of formations, recesses, extensions, slots, raceways or the like which define a passage suitable for guiding the movement of a track follower arrangement.

For the purposes of this specification, the term "track follower arrangement" shall be construed to mean a general term for a wide range of formations, apertures or recesses that are adapted to be guided along a particular passage or route, such as may be defined by a track or track formation.

As used herein the term "and/or" means "and" or "or", or both.

As used herein "(s)" following a noun means the plural and/or singular forms of the noun.

The term "comprising" as used in this specification [and claims] means "consisting at least in part of". When interpreting statements in this specification [and claims] which include that term, the features, prefaced by that term in each statement, all need to be present but other features can also be present. Related terms such as "comprise" and "comprised" are to be interpreted in the same manner.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention will now be described by way of example only and with reference to the drawings in which.

DETAILED DESCRIPTION OF THE PREFERRED EMBODIMENT(S)

Figure 1:
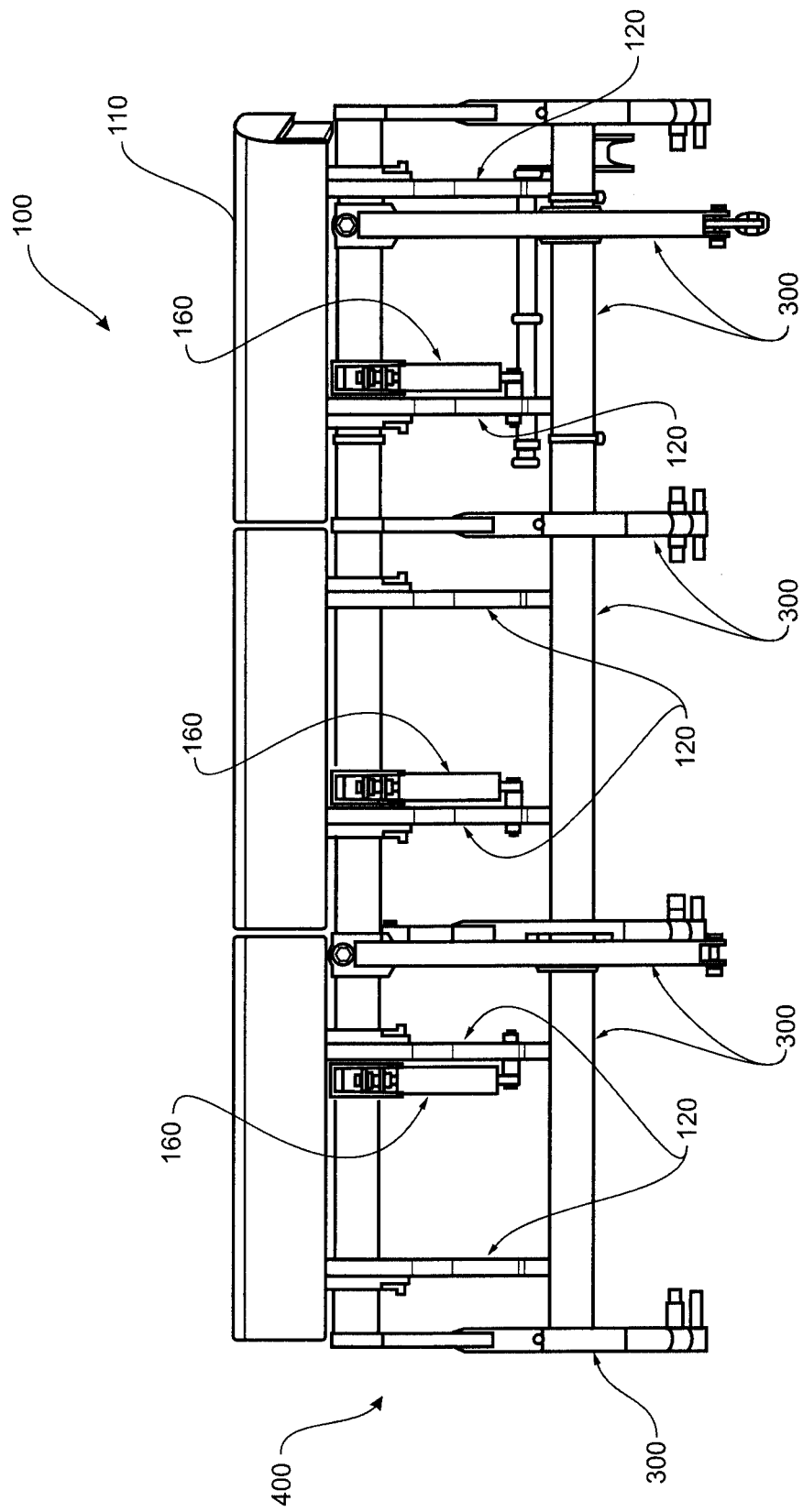
FIG. 1: shows a top view of a leg rest mechanism applied to three adjacent seats arrangements with seat pads cut away.

With reference to the above drawings, in which similar features are generally indicated by similar numerals, a leg rest mechanism according to a first aspect of the invention is generally indicated by the numeral 100.

In one embodiment now described, and according to one aspect of the invention, there is provided a leg rest mechanism 100. The leg rest mechanism is suitable for use with a seat arrangement 300 in a passenger vehicle (not shown). The seat arrangement may be an individual seat or a row of seats as shown.

The leg rest mechanism 100 comprises a support member 110 (also herein referred to as a leg rest). It can be presented to allow a leg of a person in the seat to be placed upon it whilst the person is sitting in a normal position, facing in the seat facing direction. The leg rest allows the persons legs to become more elevated. In a row of seats where adjacent leg rests can be moved to a horizontal and contiguous condition with each other and the respective seat pans of the seats, a large horizontal resting surface can be provided ontop of which a passenger or passengers can recline or lie.

The leg rest mechanism is adapted for at least partially supporting a passenger's weight.

The leg rest mechanism also includes an extension arrangement 400.

The extension arrangement 400 controls the positioning of the support member 110 relative to and adjacent the seat.

The extension arrangement 400 comprises a pair of horizontal support mechanisms 120 for supporting the support member 110, and an adjustable support mechanism 160. It may also include a drive arrangement 20.

Figure 5:
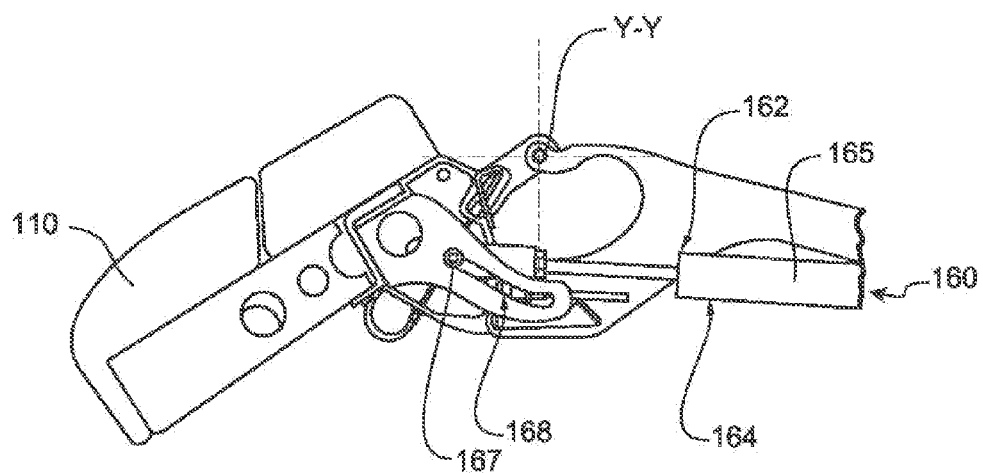
FIG. 5: shows a cutaway side view of a leg rest mechanism showing the adjustable support mechanism.
Figure 6:
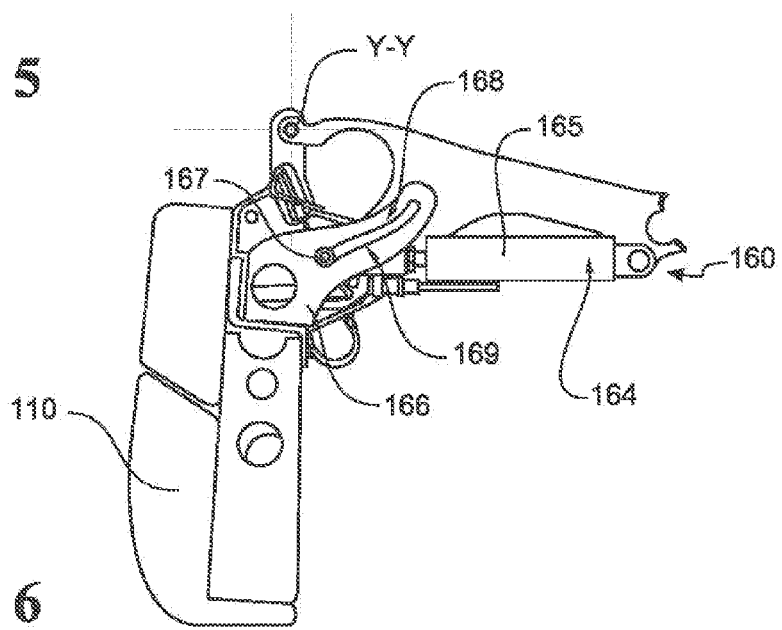
FIG. 6: shows a cutaway side view of a leg rest mechanism showing the adjustable support mechanism.

The extension arrangement facilitates the movement of the support member 110 between a stowed position as shown in FIG. 6 and an extended position as shown in FIG. 5. In the stowed position it may be positioned under the seat pad 200 of the passenger vehicle seat arrangement 300.

The support arrangement may also be held in a or any number of different intermediate positions relative to the seat.

In the preferred form the support member 110 can be moved to and held in a or any number of positioned between the stowed position and a position (herein after the "intermediate limit") between said stowed position and the extended position. The support member is preferably not able to be held in a position between extended position and the intermediate limit. Movement of the support member to and from the In the extended position the support member 110 is positioned to cooperate with the seat pad of the adjacent seat and may define a substantially horizontal surface on which a passenger is supportable. In the extended position the support member presents a surface that is substantially horizontal.

Each extension arrangement 400 comprises two mechanisms to be operative for different purposes. The first is an adjustable support mechanism 160 for supporting the support member 110 in a plurality of positions between its stowed position and the intermediate limit. The second is a horizontal support mechanism 120 for supporting the support member 110 in its extended position.

The support member 110 may be manually moveable between the stowed position and the intermediate limit. Preferably however it is driven for movement from the stowed position to or towards the intermediate limit by a drive arrangement 20.

The support member 110 is preferably only manually moveable between the intermediate limit and its extended position.

The support member 110 is mounted relative to the seat to pivot about axis Y-Y.

The support member 110 is substantially planar in configuration and may be rectangular in shape, although it could be any other shape. It may include a comfortable resilient material such as sponge, and possible lined with more hardwearing material such as fabric or leather.

Figure 8:
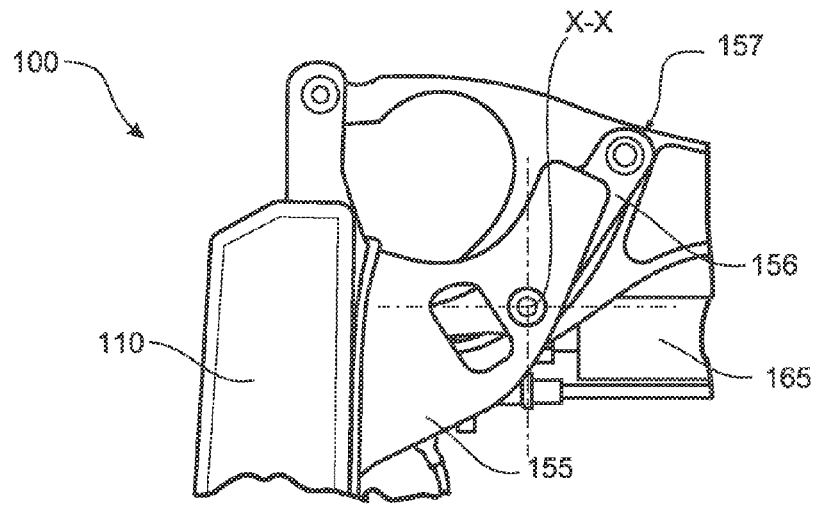
FIGS. 8-11: shows a side cutaway view of the horizontal support mechanism of a leg rest mechanism in various positions.

The horizontal support mechanism 120 includes a track formation 130 and a track follower arrangement 150. The horizontal support mechanism 120 is configurable between a stowed condition (shown in FIGS. 6 and 8), corresponding to the stowed position of the support member, in which the support member is operationally stowed under or below the seat pad 200 of the seat arrangement 300 and clear of the user's legs and feet and an extended condition (shown in FIG. 10) corresponding to the extended position of the support member 110 in which the support member 110 extends horizontally to at least partially supports a user's weight.

When the support member 110 is being supported by the horizontal support mechanism 120 in its extended position, it is envisaged that the support member 110 will be coplanar with, and co-operate with, the seat pad 200 of the seat arrangement 300 to operationally provide a horizontal support surface 210 for at least one passenger (not shown) to be supported on.

In one embodiment, the support member 110, when supported by the horizontal support mechanism 120 in its extended position, will be located adjacent the back of a similar seat arrangement 300 disposed in front of the seat arrangement 300 associated with the leg rest mechanism 100. In this way, the areas of the horizontal support surface 210 is maximised for a particular seat pitch.

Figure 15:
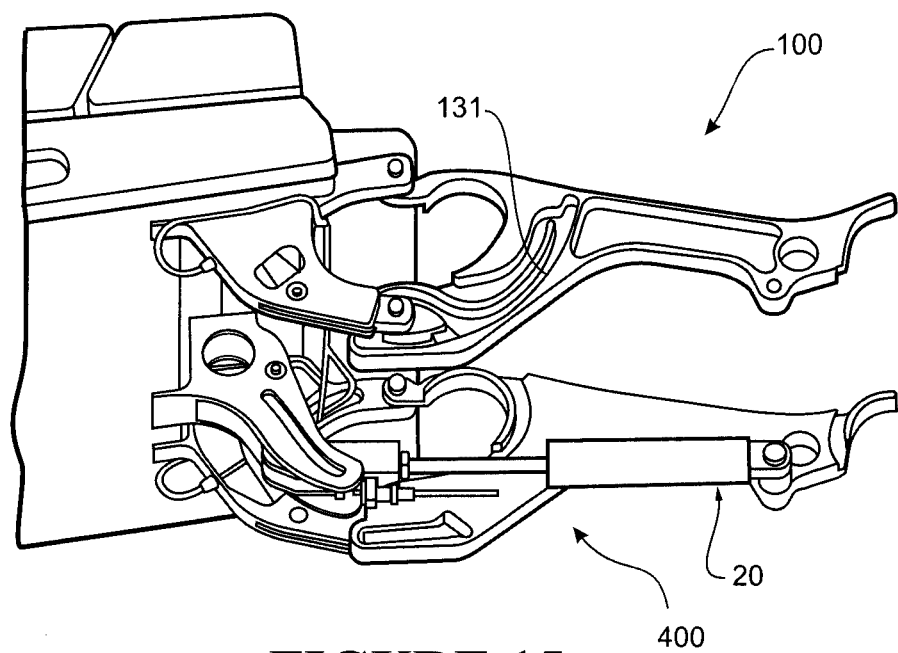
FIG. 15: shows a bottom perspective view of a leg rest mechanism.
Figure 16:
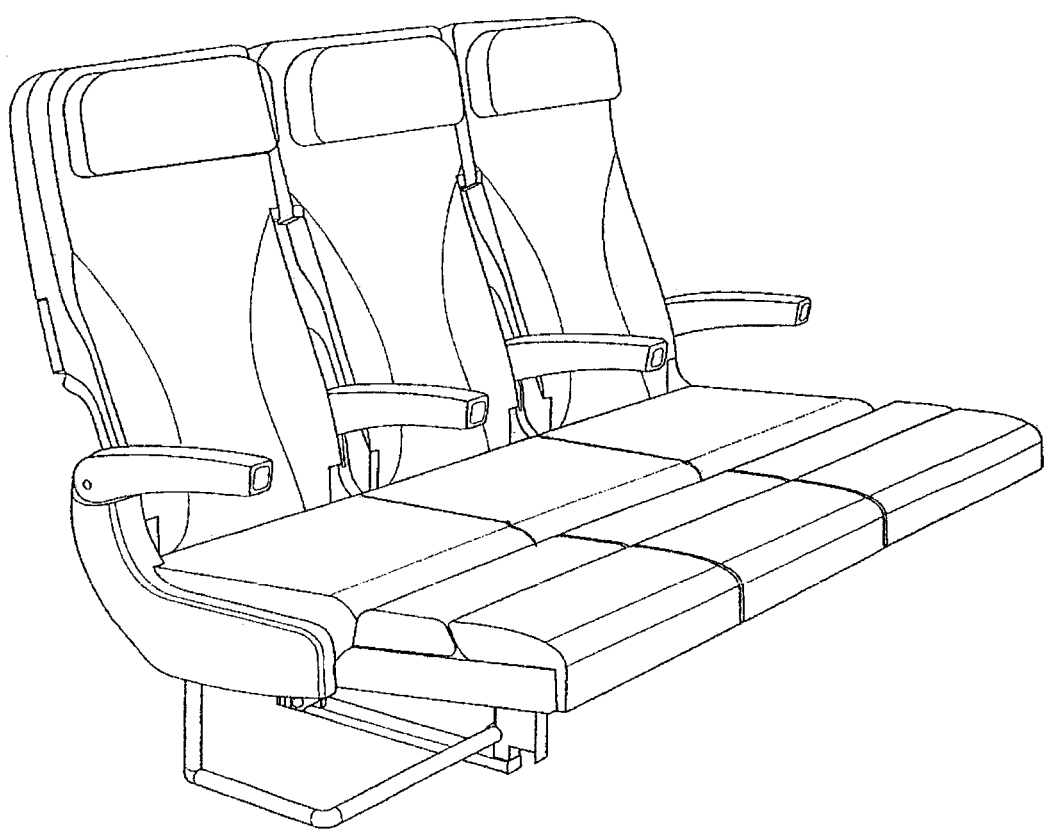
FIG. 16: shows a row of seats with leg rests

The horizontal support mechanism 120 includes a track formation 130, in one embodiment shown in FIG. 15 as a cam slot 131, associated with the vehicle seat arrangement 300; and a track follower arrangement 150. The track follower arrangement 150 is associated with the support member 110.

However, in an alternative embodiment (not shown), it is envisaged that the track formation 130 could be associated with the support member 110, and the track follower arrangement 150 associated with the vehicle seat arrangement 300.

It is further envisaged that the track formation 130 could be of a wide variety of configurations other than a slot, that would be suitable for guiding a track follower arrangement 150 along a predefined path or passage.

Figure 12:
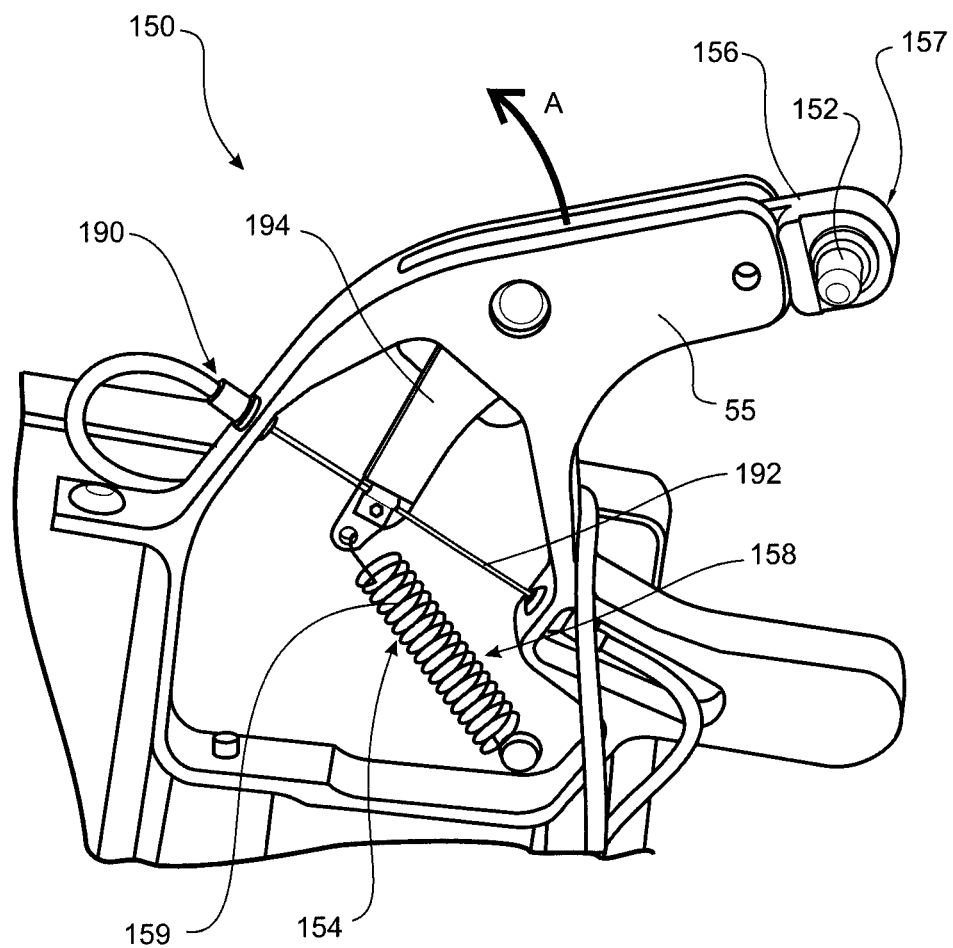
FIG. 12: shows a close-up top perspective cutaway view of a track follower arrangement and synchronisation mechanism.
Figure 13:
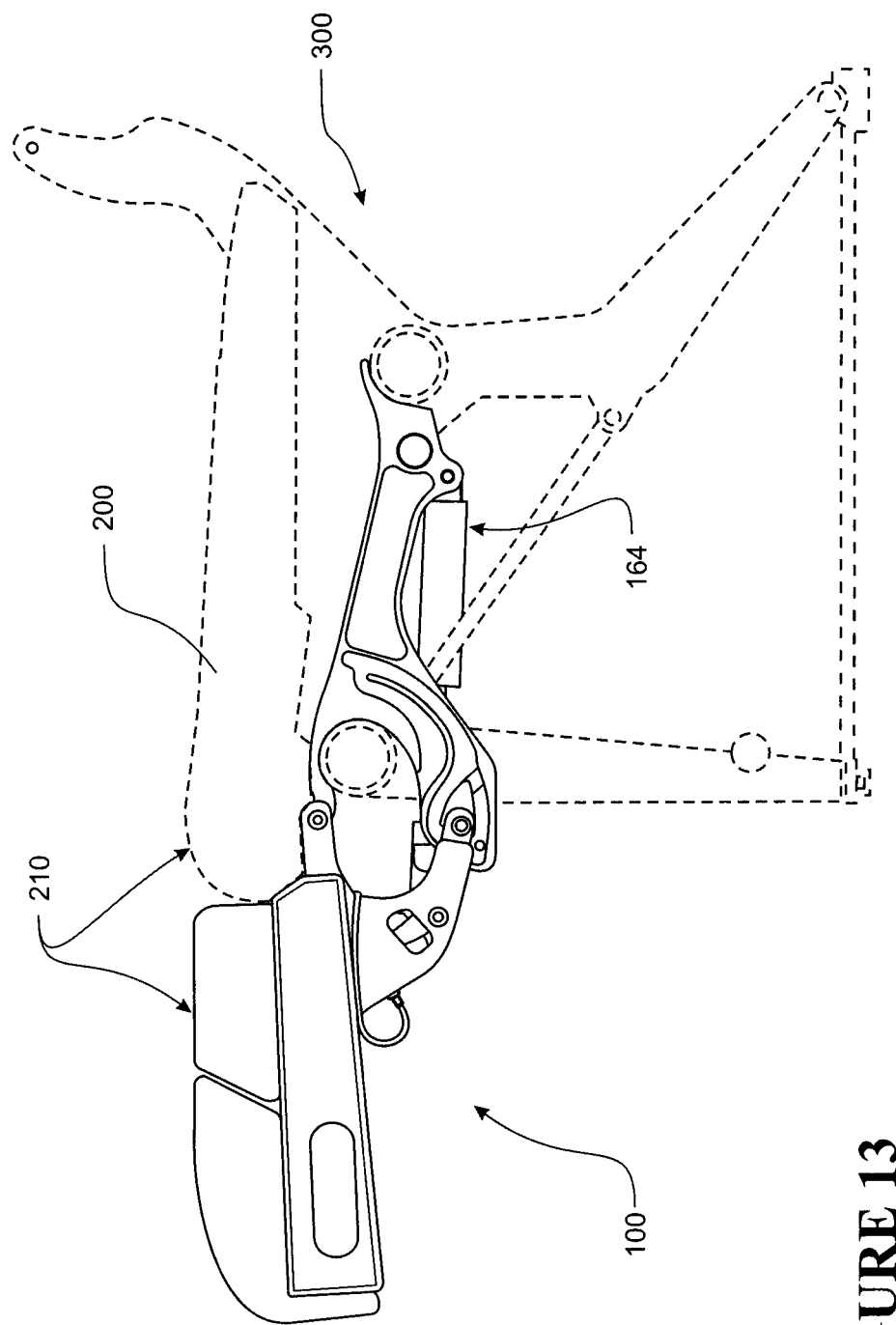
FIG. 13: shows a side view of a leg rest mechanism in a supporting position with cooperating with a seat pad of a seat arrangement to define a substantially horizontal surface on which a passenger is supportable.
Figure 14:
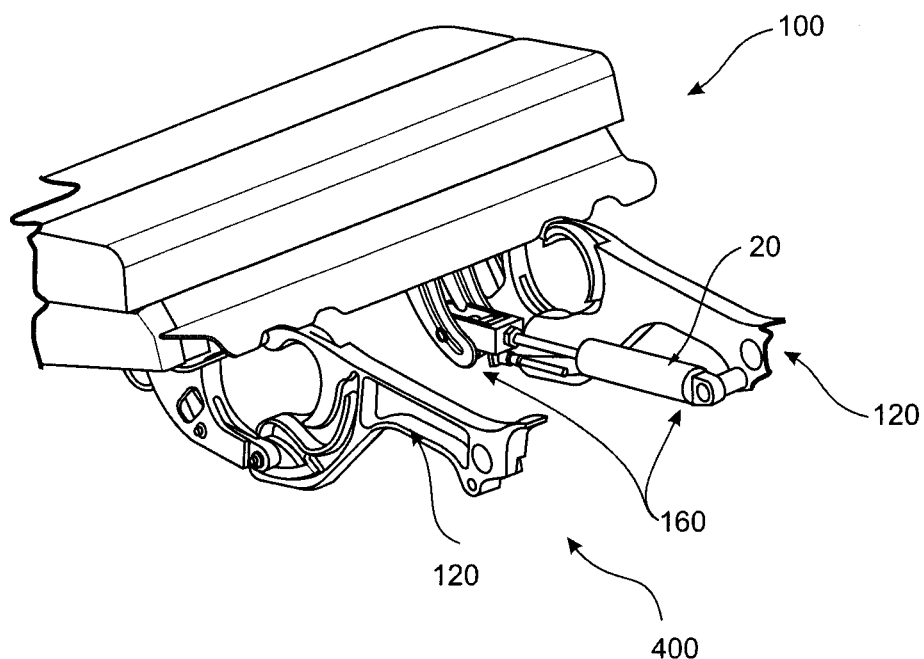
FIG. 14: shows a cutaway top rear perspective view of a leg rest mechanism.

Similarly, while the track follower arrangement 150 (as shown in FIG. 12) includes track following formation 152, which operates as a cam follower to follow a cam surface provided by the cam slot 13, it is envisaged that alternate means than a cam surface and cam follower-type arrangement could be used. In this regard, it is envisaged that in an alternative embodiment (not shown) the track follower arrangement 150 could include an aperture into which a rod could be fitted as a track formation 130. In another embodiment (not shown), a cable could be used as a track formation 130, and a hook used as a track follower arrangement 150.

In the preferred embodiment shown in the figures, the track follower arrangement 150 comprises a track following formation 152, and a biasing arrangement 154. The biasing arrangement 154 includes a pivotal member 156 that is pivotally mounted to a base member 155 at axis X-X. The base member 155 is in turn mounted to the support member 110.

Figure 9:
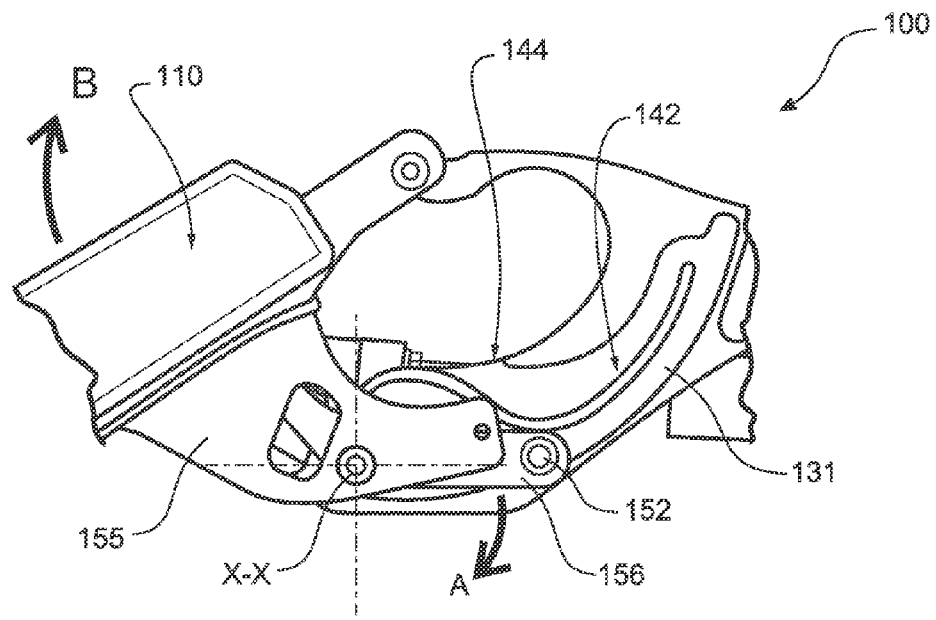

The pivotal member 156 is biased by a biasing arrangement 158 such as a spring 159 or alternatively an elastically resilient formation (not shown) to pivot about axis X-X relative to the base member 155, so that the pivotal member 156 moves clockwise as shown by arrow A in FIGS. 9 and 12. The track following formation 152 (which acts as a cam follower along cam slot 131) extends from a distal end 157 of the pivotal member 156. In this way, the spring 159 holds the track following formation 152 against the lower edge of the cam slot 131.

Figure 4:
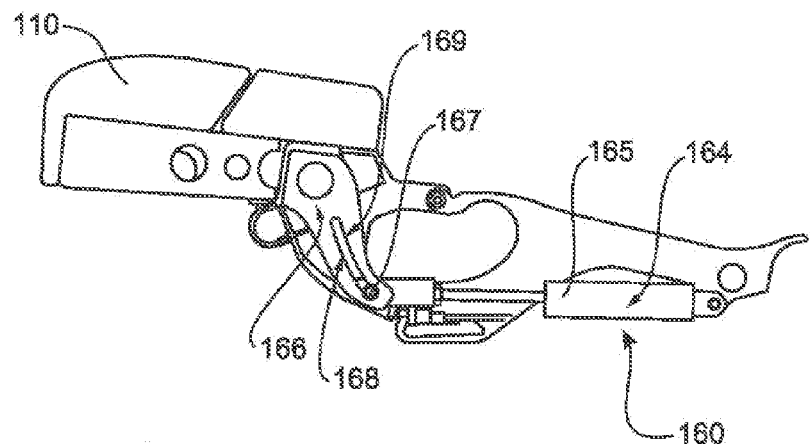
FIG. 4: shows a cutaway side view of a leg rest mechanism showing the adjustable support mechanism.

The adjustable support mechanism 160 is shown in FIGS. 4-6. It includes a locking mechanism 162 in the form of a biased piston and cylinder arrangement 164, and a reaction member 166. In a preferred embodiment, the piston and cylinder arrangement 164 is associated with the seat arrangement 300, and the reaction member 166 is associated with the support member 110, although this could be oppositely arranged.

The adjustable support mechanism 160 serves to allow the support member 110 to be moved to an infinite number of positions between its stowed position and an intermediate limit, and be locked for movement in those positions.

The preferred intermediate limit position of the major surface of the support member 110 is preferably in the range of inclination of between 30 to 70 degrees to the vertical, and most preferably to about 60 degrees to the vertical. The main point being that no fine adjustment of the support members position is possible outside of this range of between 0 degrees to the vertical and the intermediate limit position. The advantage of this is that a support mechanism having fine adjustment of the support member supported position all the way to horizontal, would require heavily structural design given the degree of cantilever that would need to otherwise be catered for.

For this reason, position adjustable support facilitated by the adjustable support mechanism 160 is allowable by the passenger up to the intermediate limit position, after which the passenger can only choose a full horizontal support position of the support member in which the horizontal support mechanism 120 is operative in offering support.

In one preferred embodiment, the piston and cylinder arrangement 164 is a "Hydrolock" piston and cylinder arrangement. It works as a hydraulic lock by allowing or stopping the flow of fluid between sides of a piston (not shown) in a cylinder 165. When fluid is allowed to flow, then movement of the piston is possible. When fluid flow is stopped, then no movement of the piston is possible. Fluid flow is typically controlled by means of a button or other actuator available to a passenger. Release of the button would result in the position of the support member 110 being locked between its stowed position and its intermediate position.

In a preferred embodiment the extension arrangement 400 further includes a drive arrangement 20. The drive arrangement includes a means for moving the support member 110 between (and preferably from) its stowed position and (to) its intermediate limit position. It is envisaged that the drive arrangement could be adapted to move the support member 110 in both directions between its stowed position and its intermediate limit position, or in only one direction. In a preferred embodiment, the drive arrangement comprises a spring received within the piston and cylinder arrangement 164 that biases the piston and cylinder arrangement 164 to extend, thereby biasing the support member 110 to its intermediate position when the locking mechanism (the Hydrolock) allows movement of the piston and cylinder arrangement 164.

However, it is envisaged that the drive mechanism could be an electric motor, a hydraulically/pneumatically operated piston and cylinder arrangement, or any other suitable driver.

As shown in FIGS. 4-5, in a preferred embodiment, the adjustable support mechanism 160 allows for lost motion movement between the support member 110 and the piston and cylinder arrangement 164 by means of a lost motion arrangement 168.

The lost motion arrangement 168 comprises a pin 167 attached to an end of the piston and cylinder arrangement 164, which is a moveable within a slot 169 in the reaction member 166. However, it is envisaged that a wide variety of lost motion arrangements could be used, including apertures and/or recesses of a wide variety of shapes.

The pin 167 is moveable within the slot 169 between an outer position (as shown in FIGS. 5 and 6) at the forward end of the slot 169, and an inner position (as shown in FIG. 4) at a rearward end of the slot 169.

When the piston and cylinder arrangement 164 extends, the pin 167 moves along the slot 169 to its outer position, after which the pin 167 pushes against the reaction member 166 to pivot the support member about axis Y-Y, thereby causing the movement of the track follower arrangement 150 along the track formation 130 as will be described below.

The piston and cylinder arrangement 164 is biased to extend when the flow of fluid is allowed (by for example the passenger pushing an actuator button—not shown), thereby causing the movement of the pin 167 in the slot 169 to its outer position, and then movement of the support member 110 in the direction of arrow B (as shown in FIG. 9) about its axis Y-Y (simultaneously causing movement of the horizontal support mechanism 120 from its stowed position). When the button is released, movement of the piston and cylinder arrangement 164 is stopped, and the support member 110 is held in that position.

In an alternative embodiment, an electric motor (not shown) or other similar mechanism can be used. This may also act as a brake to prevent movement of the support member 110 downwards such as under action of the passengers weight. A friction braking mechanism (not shown) could be used to be actuated to brake the movement of the support member 110 by brake pads (not shown) located in a calliper arrangement (not shown) that acts on a braking flange (not shown). In yet another embodiment, a releasable pin in socket type mechanism could be used to hold the passengers weight on the support member 110 when the support member 110 is between its stowed position and its intermediate limit position.

In the preferred embodiment shown in the figures, the adjustable support mechanism 160 will only push the track follower arrangement 150 in one direction—that direction in which the horizontal support mechanism 120 is moving from the its stowed position to its intermediate limit position. In a preferred embodiment, the adjustable support mechanism 160 will also cause movement of the track follower arrangement 150 along the track formation 130 until the horizontal support mechanism 120 is in its intermediate position (as shown in FIG. 9), and will then stop. The movement will stop as this may be the maximum extension of the piston and cylinder arrangement 164. The intermediate limit position of the horizontal support mechanism 120 is expected to coincide with a position of the support member 110 being in the range of about 30 degrees to 70 degrees to the vertical, and most preferably about 60 degrees to the vertical.

Figure 2:
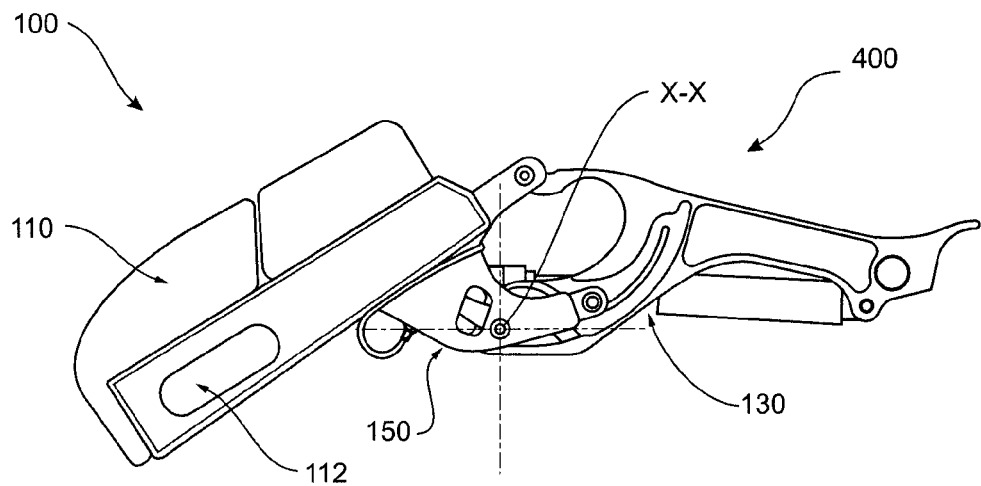
FIG. 2: shows a side view of a leg rest mechanism with the track following formation in a maintenance track for disengagement of the track follower arrangement from the track formation.
Figure 3:
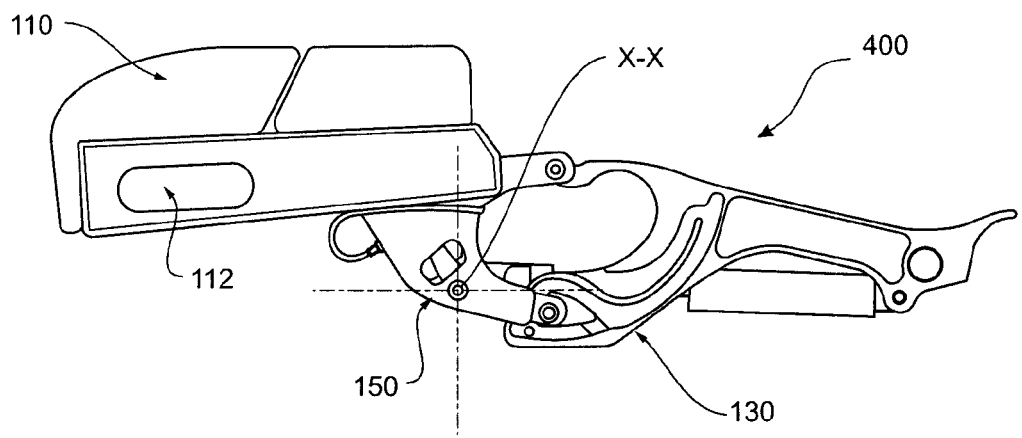
FIG. 3: shows a side view of a leg rest mechanism with support member in its extended position.

Once the intermediate limit position is reached, the piston and cylinder arrangement 164 cannot extend further. In this position, the pin 167 of the lost motion arrangement 168 will be in its outer position. If a passenger wants the support member 110 to move further and to its extended position, they will be required to grab the support member 110, eg by grabbing a manual handle 112 on the support member (as shown in FIGS. 2 and 3) or the extension arrangement 12, and pull the horizontal support mechanism 120 to its extended position by pulling upwards on it, which will have an effect as described below.

It is envisaged that when the support member 110 is pulled on manually by a passenger to extend the horizontal support mechanism 120 to its extended position, the pin 167 of the lost motion arrangement 168 will move towards its inner position along the slot 169. In this way, manual operation is allowable without a passenger having to pull against any resistance of the locking mechanism 162.

In another embodiment and according to a further aspect of the invention, it is envisaged that the leg rest mechanism 100 can be completely manually operated and not include an drive arrangement 20 at all. In another embodiment, it is envisaged that the adjustable support mechanism 160 can operate by means of a spring release mechanism to just push the support member out from under the seat pad 200, after which the horizontal support mechanism 120 will be manually movable.

The track follower arrangement 150 follows the track formation 130 as the support member 110 is moved between its stowed position and extended position, through its intermediate limit position. The track formation 130 and track follower arrangement 150 are moveable relative to each other between a stowed position corresponding to the stowed position of the support member 110, an intermediate limit position corresponding to the intermediate position of the support member 110, and an extended position corresponding to the extended position of the support member 110.

The track formation 130 may define a terminal end 133 and an endless path 132 at an opposed side of the track formation 130 to the terminal end 133. The endless path 132 further defines a detent formation 134 in the form of a recessed region 163 or U-shaped kink in the cam slot 131. The track follower arrangement 150 can be captured by this recessed region 163. It is envisaged that the track follower arrangement 150 will not be pushed into this recessed region 163 by the drive arrangement 20, as the drive arrangement will operate to only push it to the intermediate limit position as shown in FIG. 9.

Instead, when a passenger manually pulls the manual handle 112 upwardly, this will cause the track follower arrangement 150 to move along the track formation 130 and into the recessed region 163.

It is envisaged that the support member 110 will be require to be pulled upwardly into an overextended position in order for the track following formation 152 to be able to move around the distal most point of the endless path 132 before the track following formation 152 is captured in the recessed region 136. When the support member 110 is in its overextended position, the relative position of the track formation 130 and track follower arrangement 150 will be in an overextended position.

When the track following formation 152 has traversed over the distal most point of the endless path 132, it will move into the recessed region 136. This may be further facilitated under action of the biasing arrangement 154.

Then when the manual handle 112 is released, the shape of the recessed region 136 of the detent formation 134 prevents the relative movement of the track follower arrangement 150 and track formation 130 back to towards the stowed position. The track follower arrangement 150 is captured in the detent formation 134, so that a passenger can put their legs up onto the support member and have their legs supported without fear of it giving way. The extension arrangement may be sufficiently strong to take the full weight of a passenger.

The radius from the axis of the support member Y-Y to the axis of the pivotal member x-X-X is similar to radius from the axis of the support member Y-Y to the centre of the circularly shaped track follower arrangement 150. This will prevent pivotal movement of the pivotal member 156 when force is exerted by a passenger on the support member 110.

It another embodiment, it is envisaged that a stop formation could be provided to stop the pivotal movement of the pivotal member 156 when the track follower arrangement 150 is in the recessed region 136.

The extended position is also envisaged as corresponding to the position of the support member 110 being co-planar with the seat pad 200 of the seat arrangement 300.

The detent formation 134 provides a locking mechanism that positively locks the movement of the track follower arrangement 150 in the detent formation 134. The detent formation 134 also co-operates with the biasing arrangement 154 of the track follower arrangement 150, to allow movement of the track follower arrangement along the track formation 130 in one direction only, as will be described below.

Figure 10:
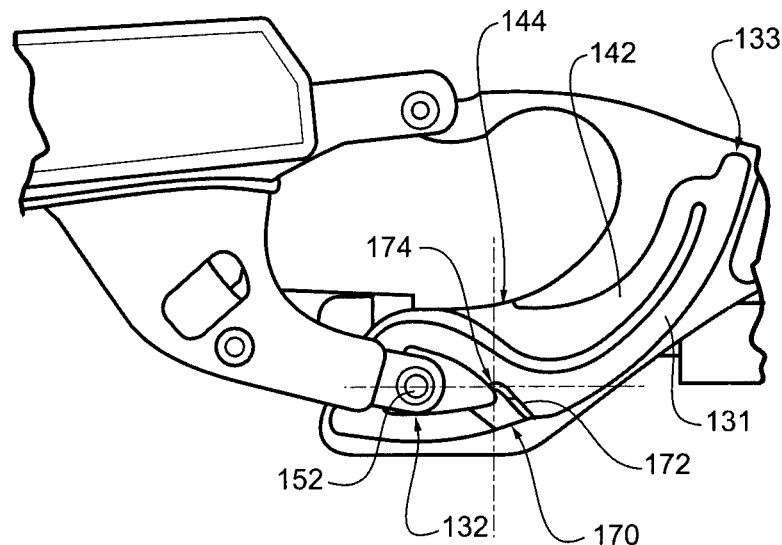
Figure 11:
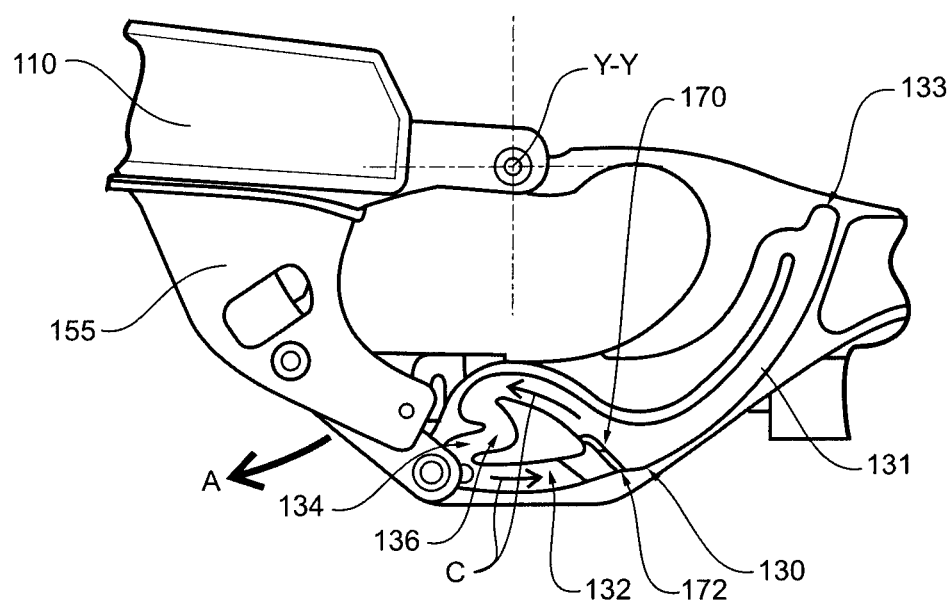

As may be seen in FIG. 11, the cam slot 131 starts at a terminal end 133, and traverses an endless path 132 towards the opposed direction. It traverses in a loop-shape endless path 132 with a recessed region 136 in it (in a U-shape). When the horizontal support mechanism 120 is initially moved from its stowed position, the track following formation 152 starts at the terminal end 133 of the cam slot 131. As the track following formation 152 moves along the cam slot 131, it is prevented from moving in a clockwise direction along the endless path by a one way mechanism 170 located along the track formation 130 (as shown on FIG. 10). The one way mechanism 170 comprises a track closure formation 172 that pivots about an axis 174 that is disposed to the top side of the track formation 130.

The track closure formation 172 pivots between a restricted position in which it restricts movement of the track following formation 152 through the cam slot in one direction, and an unrestricted position in which it allows movement of the track following formation 152 along the cam slot 131. The track closure formation 172 is biased to its restricted position by a biasing means, such as by gravity (as shown in the figures) or under the effect of a spring (not shown).

The track closure formation 172 is adapted and configured to be moved by the track following formation 152 to move from its restricted position to its unrestricted position to enable movement of the track following formation 152 along the cam slot 131 when the track follower arrangement moves in one direction shown as arrow C in FIG. 11. However it locks in its restricted position when the track following formation 152 pushes on it from the opposite direction. In this way, the track following formation 152 is pushed upwardly to traverse the endless path in an anti-clockwise direction (as shown on FIG. 11) when being moved from the terminal end 133 of the cam slot 131 towards the endless path 132.

As shown in FIG. 9, the intermediate position of the support member 110 corresponds to the track following formation 152 being part of the way along the endless path 132 in the anti-clockwise direction, or just before the endless path 132.

Manual movement of the extension arrangement 400 by a passenger pulling upwardly on the manual handle 112 results in further movement of the track following formation 152 in the direction of Arrow C.

As the track following formation 152 moves into the recessed region 136, the biasing arrangement 154 of the track follower arrangement 150 will bias the track following formation 152 to move further into the recessed region 136 and stop at the bottom of its U-shape. It should be noted that the shape and configuration of the track formation 130 is specifically designed to follow the path of movement of the track following formation under action of the biasing arrangement 154 at this stage.

In a preferred embodiment, the pair of horizontal support mechanisms 120 include a synchronisation mechanism 190 to ensure that the track following formations 152 of each of the horizontal support mechanisms 120 are in synchronisation with each other at the same location on each of their respective track formations 130.

Each synchronisation mechanism 190 comprises at least one cable 192 securely fastened to a synchronisation lever 194. Each synchronisation lever 194 is secured to the pivotal member 156 to pivot about the same axis X-X as it. In a preferred embodiment, the synchronisation levers 194 are integrally formed with the pivotal member 156. To enable the most effective leverage of the cables 192 on the synchronisation lever 194, the cables extend at a tangent to a radius extending from the axis X-X of the pivotal member 156.

The cables 192 of each synchronisation mechanisms 190 are connected to each other, so that movement of the pivotal member 156 (and hence synchronisation lever 194) of one results in similar movement of the synchronisation lever 194 of the other. In this way, the situation is prevented, for example, that only one of the track following formations 152 is received into their respective recessed regions 136, while the other remains "jammed" at a highest point on the endless path 132.

According to one aspect of the invention, it is envisaged that the adjustable support mechanism 160 will only power movement of the support member 110 between its stowed position, and the intermediate limit position. From this intermediate position, the horizontal support mechanism 120 is only manually moveable to its extended position. In this way injuries to users caused by movement of the horizontal support mechanism 120 to its fully extended position, are prevented.

Further manual lifting by a passenger of the horizontal support mechanism 120 (whether indirectly by applying a lifting force to the support member 110 or directly on the horizontal support mechanism 120 itself) will cause the biasing arrangement 154 to move the track following formation 152 to move further along the cam slot 131 in an anti-clockwise direction. It should be noted that the shape of the cam slot 131 is specifically configured and adapted to correspond to the direction of travel of the track following formation 152 under action of the biasing arrangement 154 while the extension arrangement is being lifted by a passenger.

As the track following formation 152 transitions further in the direction of Arrow C about the endless path 132, it reaches the end of the recessed region 136. At this stage, the passenger is required to push downwardly on the support member 110 or extension arrangement 120, to cause the pivotal member 156 to be moved against the bias of the biasing arrangement 154. Further downward pushing will result in the further movement of the track following formation 152 in the direction of Arrow C along the endless path 132 until it reaches the one-way mechanism 170.

At this stage, when the support member is being pivoted downwardly about its axis Y-Y, the pin 167 of the lost motion arrangement 168 is moving towards its inner position in the slot 169. When the inner position is reached, then the piston and cylinder arrangement 164 will need to start retracting. In order to do so, it is envisaged that a passenger may be required to actuate the actuator button to enable movement of the piston and cylinder arrangement 164. Similarly, if other locking mechanisms are used, then it is envisaged that they will be required to be in an unlocked state to allow further movement of the support member 110.

When the track following formation 152 encounters the track closure formation 172 in its restricted position, it will cause the track closure formation 172 to pivot upwardly and out of its way to an unrestricted position. The track following formation 152 then moves through the cam slot 131 in an unrestricted fashion. Once the track following formation 152 has passed the one-way mechanism 170, the track closure formation 172 will fall down behind it under action of gravity, although it is envisaged that a biasing means (not shown) could also be provided to bias the track closure formation to a restricted position.

Further manual pushing on the support member 110, will result in the track following formation 152 moving towards the terminal end 133 of the track formation 130.

This can be alternately be accomplished by actuating the adjustable support mechanism 160 to operate in reverse to retract instead of extend. This would only be possible if the drive arrangement 20 is configured and adapted to retract under power.

Figure 7:
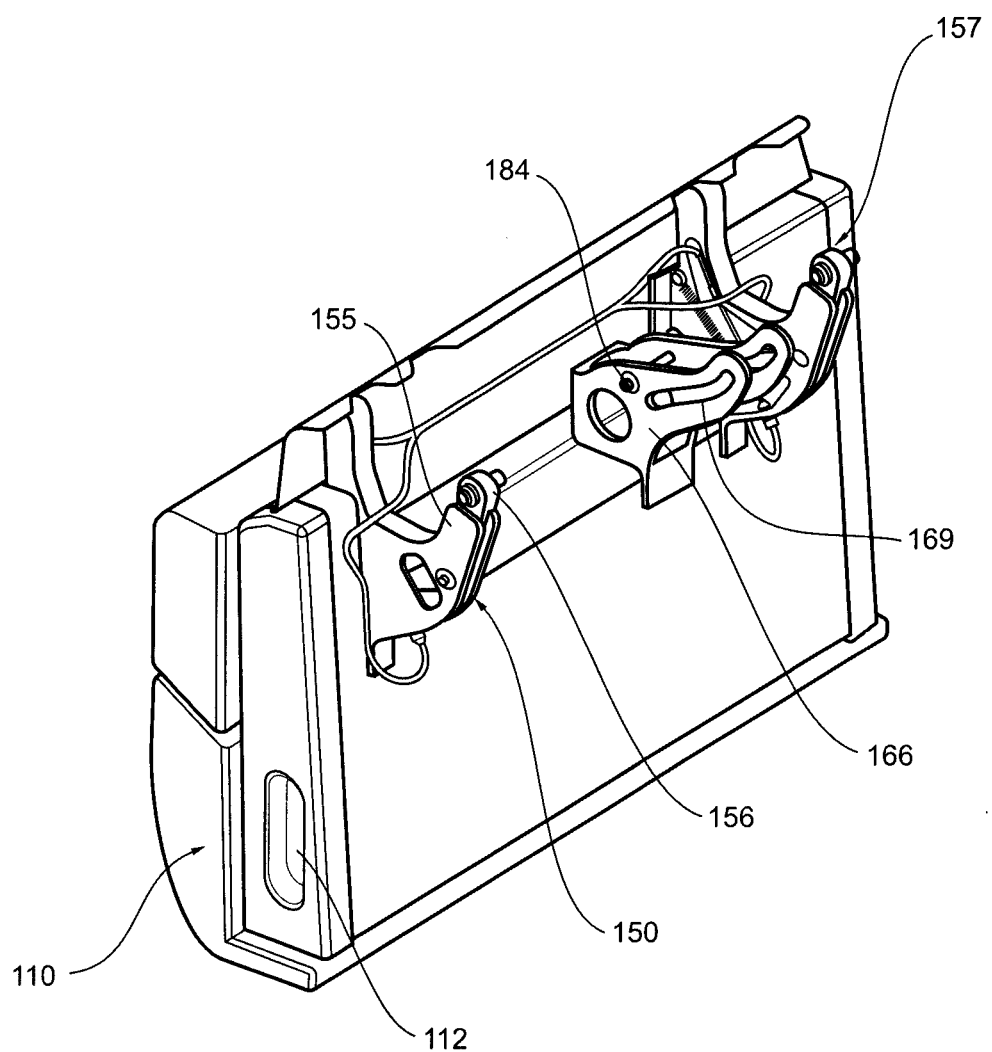
FIG. 7: shows a top perspective cutaway view of the support member, track follower arrangements, and reaction member.

It is envisaged that, as the horizontal support mechanism 120 is moved to its stowed position, a latch mechanism (not shown) associated with one or more of the adjustable support mechanism 160 and the horizontal support mechanism 120 will engage, to hold the support member 110 in its stowed position until released again by, for example, pressing the actuator button to allow the Hydrolock piston and cylinder arrangement 164 to extend under action of its bias as described above. In one embodiment and as shown in FIG. 7, the latch mechanism is in the form of a hook (not shown) and pin 184. The hook (not shown) is associated with the piston and cylinder arrangement 164, and the pin 184 is associated with the reaction member 166, so that if the adjustable support mechanism 160 is reversed to move the horizontal support mechanism 120 to its stowed position, the hook will engage with the pin 184 to lock the horizontal support mechanism 120 in its stowed position until the adjustable support mechanism is actuated again. Of course it should be noted that the Hydrolock piston and cylinder arrangement 164 acts as a latch mechanism itself to hold the support member 110 in its stowed position.

When the drive arrangement 20 is actuated to move the support member 110 from its stowed position to the intermediate position again, the hook will automatically release the pin 184 as the piston and cylinder arrangement 164 extends.

In another embodiment it is envisaged that the release of the latch mechanism 180 can be actuated by an actuating mechanism (not shown) that operates simultaneously with the actuation of the adjustable support mechanism 160 or drive arrangement 20, or if no drive arrangement 20 is present, by the actuation of a separate actuating lever or handle (not shown).

Where no adjustable support mechanism 160 is provided, a passenger may be required to move the support member 110 into its stowed position against the action of a spring bias from the drive arrangement 20 if such is provided.

While the detent formation 134 shown in the figures is a recessed region 136, it should be understood that the detent formation 134 could also be a pivoting latch-type mechanism (not shown) that is similar to the one way mechanism 170. However, the use of a recessed region 136 is preferred as it allows for smooth operation of the track following formation 152 along the track formation 130, and it allows a passengers weight to be supported on the track formation 130 itself, which is relatively robust.

Where the detent formation 136 is a latch type formation, then an endless path 132 is not required, as a release mechanism (not shown) can be provided to disengage such a latch mechanism to allow movement of the extension arrangement back to its stowed position.

As shown in FIGS. 9 and 10, it is envisaged that the track formation 130 could include a maintenance track formation 142 that will allow the track follower arrangement 10 to be completely disengaged from the track formation for maintenance and access reason. Once disengaged, the support member 110 can be pivoted upwardly to extend far past the position that it would be in when the horizontal support mechanism 120 is in its extended position.

The maintenance track formation 142 extends from near the terminal end 133 of the track formation 130 to an open end 144. The track following formation 152 can be moved into the maintenance track formation 142 as shown in FIG. 2 by appropriate manipulation of the pivotal member 156.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

In addition, where features or aspects of the invention are described in terms of Markush groups, those skilled in the art will recognise that the invention is also thereby described in terms of any individual member or subgroup of members of the Markush group.

The invention claimed is:

1. A leg rest mechanism suitable for use together with a seat pad of a seat in a passenger vehicle, said leg rest mechanism comprising:
a support member moveably mounted adjacent said seat and adapted for supporting a passenger's leg;
said support member is supported in and is moveable between
a stowed position in which the support member is stowable under the seat pad of the seat and;

an extended position in which the support member defines a substantially horizontal surface coplanar with the seat pad on which a passenger is at least in part supportable; and at least one intermediate position located between the stowed position and an intermediate limit between the stowed position and the extended position; and an extension arrangement for supporting the support member, including an adjustable support mechanism including a drive arrangement for driving movement of the support member between the stowed position and the intermediate limit, a horizontal support mechanism for supporting the support member in the extended position, wherein the adjustable support mechanism only said support member when positioned between the stowed position and the intermediate limit, and wherein the support member is moveable between the intermediate limit and the extended position only by manually lifting the support member.

2. A leg rest mechanism suitable for use together with a seat pad of a seat in a passenger vehicle, said leg rest mechanism comprising:

a support member adapted for supporting a passenger's leg, said support member being moveable between a stowed position in which the support member is stowable under the seat pad of the passenger vehicle seat and;

an extended position in which the support member defines a substantially horizontal surface on which a passenger is at least partially supportable; and at least one intermediate position located between the stowed position and an intermediate limit between the stowed position and the extended position; and an extension arrangement for supporting the support member in the intermediate position and the extended position, said extension arrangement, including an adjustable support mechanism for only supporting the support member in the intermediate position between the stowed position and the intermediate limit, a horizontal support mechanism for supporting the support member in the extended position; and a lost motion arrangement for disengaging the support member from the adjustable support mechanism such that the support member may be moved from the intermediate limit to the extended position, wherein the support member is only manually moveable between the extended position and the intermediate limit.

3. A leg rest mechanism as claimed in claim 2 wherein the extension arrangement comprises a plurality of horizontal support mechanisms.

4. A leg rest mechanism as claimed in claim 2 wherein the adjustable support mechanism includes a drive arrangement for driving movement of the support member between the stowed position and the at least one intermediate position.

5. A leg rest mechanism as claimed in claim 4 wherein the drive arrangement operates by a biasing means.

6. A leg rest mechanism as claimed in claim 5 wherein the biasing means is a spring.

7. A leg rest mechanism as claimed in claim 2 wherein the support member is pivotally coupled to the seat in a manner so that in the extended position, the support member is disposed so that the seat pad and the support member together cooperate to form a substantially horizontal surface.

8. A leg rest mechanism as claimed in claim 2 wherein the horizontal support mechanism comprises a track formation associated with one selected from the support member and the seat; and a track follower arrangement associated with the other selected from the support member and the seat;

the track follower arrangement following at least part of the track formation as the extension arrangement is moved between the stowed position and extended position;

wherein the track formation defines a detent formation for capturing the track follower arrangement as the track follower arrangement moves along the track formation in one direction, thereby to prevent the movement of the support member to the stowed position by movement of the track follower arrangement along the track formation in the opposite direction.

9. A leg rest mechanism as claimed in claim 8 wherein the track formation follows an endless path along at least part of the length of the track formation, so that movement of the track follower arrangement along the track formation along the endless path will allow the extension arrangement to return to the stowed position by movement of the track follower arrangement along the track formation.

10. A leg rest mechanism as claimed in claim 8 wherein the track formation includes a one-way mechanism that allows movement of the track follower arrangement along the track formation in one direction only.

11. A leg rest mechanism as claimed in claim 10 wherein the one-way mechanism comprises a pivoting track closure formation.

12. A leg rest mechanism as claimed in claim 8 wherein the track follower arrangement and track formation are moveable relative to each other between a stowed position corresponding to the stowed position of the support member, an intermediate position corresponding to the intermediate position of the support member, and an extended position corresponding to the extended position of the support member and in which the horizontal support mechanism supports the support member in the extended position.

13. A leg rest mechanism as claimed in claim 2 wherein the adjustable support mechanism comprises a locking mechanism and a reaction member, one of the reaction member and the locking mechanism is secured to one of the seat and the support member, and the other of the reaction member and the locking mechanism is secured to the other of the seat and the support member, the locking member able to lock the support member in the intermediate position(s).

14. A leg rest mechanism as claimed in claim 13 wherein the locking mechanism includes a piston and cylinder arrangement.

15. A leg rest mechanism as claimed in claims 2 wherein in the extended position, the support member cooperates with the seat pad of the seat to operationally provide a horizontal support surface for at least one passenger to be supported on.

16. A leg rest mechanism as claimed in claim 2 wherein the extension arrangement is manually moveable from the intermediate limit position to the extended position by a person exerting manual force on one or more selected from the support member and extension arrangement.

17. A leg rest mechanism as claimed in claim 2 wherein one or more selected from the support member and extension arrangement includes at least one manual handle.

18. A leg rest mechanism as claimed in claim 2 wherein the support member is pivotally moveable relative to the seat.

19. A leg rest mechanism as claimed in claim 2 wherein the support member is pivotally moveable relative to the seat about an axis located adjacent the front edge of the seat pad and extending perpendicular to the seat facing direction.

20. A seat arrangement including a seat and the leg rest mechanism as claimed in claim 2 engaged to said seat in a manner to allow the support member to be supported in and to move, in a pivotal manner relative to said seat about an axis that is perpendicular to the seat facing direction, between said stowed position, at least one intermediate position and the extended position.

21. A leg rest of a seat, that can move between a stowed position adjacent and below the seat pan of the seat and a fully extended position adjacent and substantially co-planar with the seat pan, said leg rest comprising;
   a leg rest pad adapted for supporting the legs of a passenger sitting in the seat, the leg rest pad pivotally mounted to said seat to pivot about an axis perpendicular to the seat facing direction between the stowed position and the fully extended position, passing through an intermediate limit position intermediate of the stowed position and the extended position;
   an extension arrangement for pivotally moving the leg rest pad between the stowed position and the extended position and for holding the leg rest pad at least in the extended position, and
   an actuator to cause movement of the extension arrangement;
   wherein the actuator can only cause movement to move the leg rest pad between the stowed position and the intermediate limit position, and
   wherein movement of the leg rest pad from the intermediate limit to the extended position is only via direct manual manipulation of the leg rest pad.

22. A leg rest as claimed in claim 21 wherein movement of the leg rest pad from the intermediate limit to the extended position can be actuated manually by virtue of a lost motion mechanism.

23. A leg rest as claimed in claim 21 wherein the extension arrangement and the actuator are supported by said seat.

24. A seat comprising a leg rest as claimed in claim 21.

25. A seating arrangement on an aircraft comprising a plurality of rows of seats each row including at least one seat as claimed in claim 24 positioned to face is the same direction, each row positioned one behind the other and spaced apart with a gap between the rows that is substantially spanned by the leg rest when in the extended position.

26. A method of operating a leg rest mechanism for a seat arrangement of a passenger seat, said seat arrangement comprising at least a seat pad and a support member, said method comprising the steps of:
   actuating an adjustable support mechanism to cause pivotal movement of a support member between a stowed position and an intermediate position up to an intermediate limit position; and
   once the support member has reached the intermediate limit position, manually pivoting the support member to an extended position to form a coplanar surface with the seat pad.

27. A method of operating a leg rest mechanism as claimed in claim 26 wherein the extension arrangement supports the support member in the extended position in a configuration so that the support member forms a co-planar surface with the seat pad.

28. A method of operating a leg rest mechanism as claimed in claim 26 wherein the co-planar surface formed by the support member and the seat pad is horizontal.

29. A method of operating a leg rest mechanism as claimed in claim 26 wherein the extension arrangement supports the support member in the extended position to be adjacent to or abut with a similar seat arrangement in front of the seat arrangement.

30. A seat arrangement comprising three contiguous seats each including a leg rest as claimed in claim 2, wherein the three contiguous seats can cooperate together to form a horizontal support surface for at least one passenger to lie or recline on.

\* \* \* \* \*